United States Patent [19]
Daxer et al.

[11] 3,868,435
[45] Feb. 25, 1975

[54] PROCESS FOR MAKING MOLDED SILICON BODIES

[75] Inventors: Hilmar Daxer, Munich, Germany; Wolfgang Dietz, Palos Verdes Peninsula, Calif.; Hans Herrmann, Burghausen, Germany; Manfred Vogerl, Santa Monica, Calif.

[73] Assignee: Consortium fur Elecktrochemische Industrie GmbH, Munich, Germany

[22] Filed: Dec. 6, 1972

[21] Appl. No.: 312,584

Related U.S. Application Data

[63] Continuation-in-part of Ser. No. 118,821, Feb. 25, 1971, abandoned.

[30] Foreign Application Priority Data
Feb. 28, 1970  Germany.............................. 2009459

[52] U.S. Cl.......................... 264/1, 264/26, 264/81, 264/85, 264/332
[51] Int. Cl........................... B29c 1/04, B29d 11/00
[58] Field of Search......... 264/338, 332, 81, 25, 26, 264/1, 125

[56] References Cited
UNITED STATES PATENTS

| | | | |
|---|---|---|---|
| 2,935,386 | 5/1960 | Selker............................... | 264/26 X |
| 3,041,690 | 7/1962 | Mytton............................ | 264/338 X |
| 3,576,932 | 4/1971 | Biddulph......................... | 264/332 X |
| 3,609,829 | 10/1971 | Carrell.............................. | 264/81 X |

*Primary Examiner*—Richard R. Kucia
*Attorney, Agent, or Firm*—Allison C. Collard

[57] ABSTRACT

Process for making a molded silicon body by inductive heating in a mold capable of being cooled involves placing against the inner surface of the mold a body of pressure-sintered finely structured quartz having the same configuration as the interior portion of the mold, then introducing into the lined mold highly purified silicon in granular form, melting the silicon, cooling and recovering the silicon melt.

3 Claims, 1 Drawing Figure

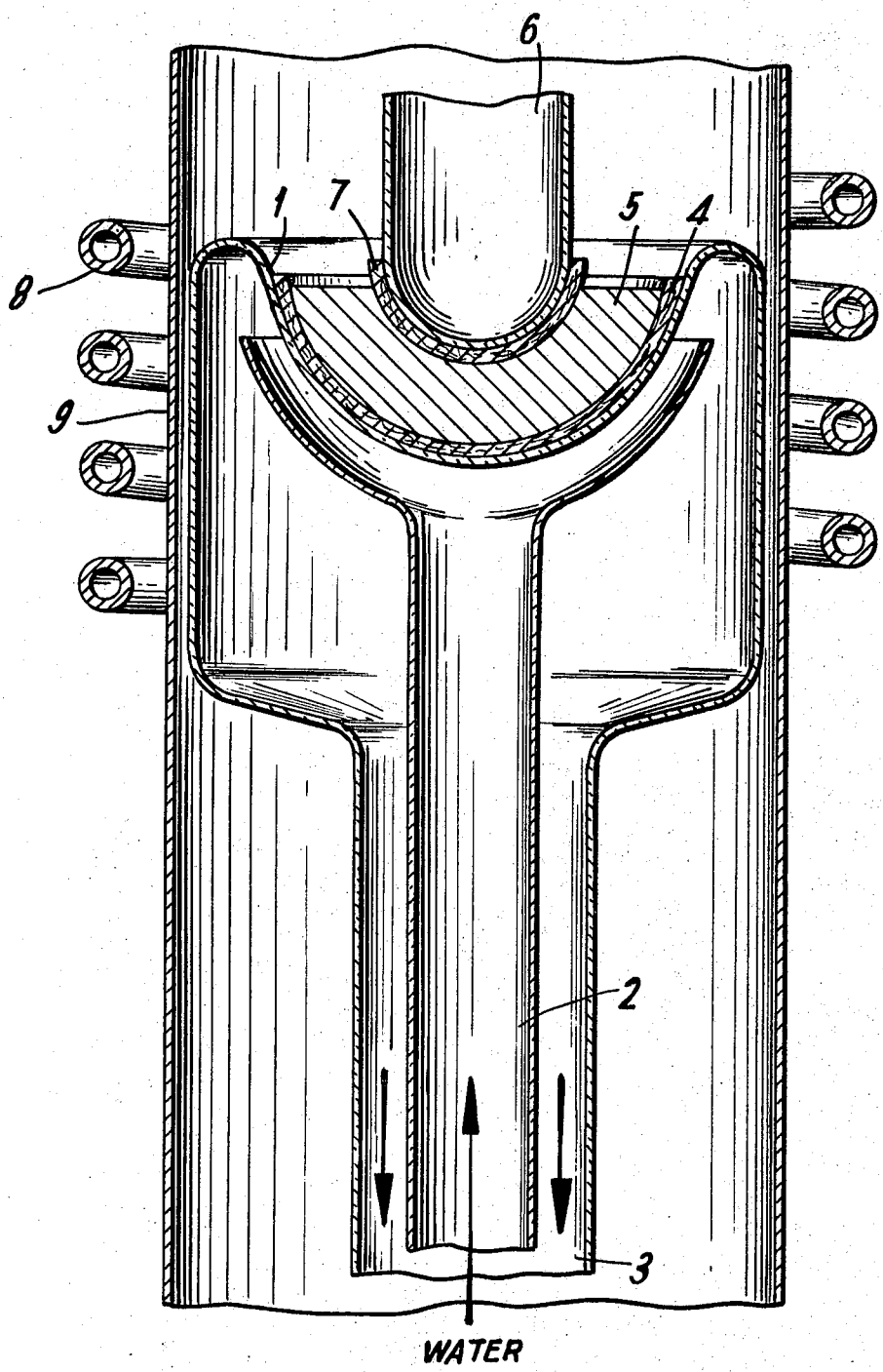

PROCESS FOR MAKING MOLDED SILICON BODIES

CROSS-REFERENCE TO COPENDING APPLICATION

This application is a continuation-in-part of copending application Ser. No. 118,821, filed Feb. 25, 1971 and now abandoned.

BACKGROUND OF THE INVENTION

Molded bodies of silicon, for example discs or semispherical shells, are important for optical purposes in the infrared spectrum field. In order to achieve good optical perviousness (good transmission) the silicon crystals must be coarsely crystalline and arranged in the molded body perpendicularly to the surface. One can obtain such oriented growth of crystals only when a melt solidifies in a strong temperature gradient, e.g. starting from a cooled surface.

It is known, for instance, how to melt silicon in a water-cooled copper crucible by inductive heating and then to cool it slowly. There, however, the silicon is soiled so much by copper that it is useless for optical purposes. Also previously described was the use of quartz molds. Although there is no troublesome pollution of the silicon melt, the solidified silicon adheres so strongly to the quartz that during the cooling the quartz mold and the silicon crack due to the different expansion coefficients.

Another method uses a quartz vat with molten silicon into which a cooled graphite body is immersed on whose surface the silicon solidifies immediately and thus protects the melt from pollution by graphite. In this manner one can produce molded silicon bodies which are useable for optical purposes. However, the apparatus requirements are very great because the cooling of the graphite body must be controlled in accordance with a temperature program. Also, the silicon melt placed in the quartz vat cannot be converted completely into molded parts, so that losses of silicon occur. Moreover, the quartz vat breaks when the balance of the silicon solidifies (Runyon, Silicon Semi-Conductor Technology, New York, 1965, pages 17–27).

BRIEF SUMMARY OF THE INVENTION

We have now discovered a process for producing molded bodies of silicon by melting pure silicon by means of inductive heating in a cooled mold with inert gas protection and subsequent cooling of the melt. The process is characterized by the fact that the surface of the mold which gets into contact with silicon is covered with a molded body of sintered quartz wool and/or sintered quartz sand.

With these molded bodies of sintered quartz particles the doping of the molded material is prevent. Moreover, this elastic material absorbs the mechanical stresses occurring at the boundary surfaces due to the cooling. The produced silicon body is removed from the mold with the quartz preparation. And it is surprising that the quartz preparation, unlike a quartz crucible, can be easily removed from the surface of the silicon body.

DETAILED DESCRIPTION OF THE INVENTION

In accordance with the present invention, there is provided a novel process for making molded silicon bodies by melting pure silicon in a mold capable of being cooled, comprising the steps of (a) placing against the inner surface of said mold a liner consisting of a solid body of pressure-sintered finely structured quartz having substantially the same configuration as the interior portion of the mold, (b) introducing into the lined mold highly purified silicon in the form of fine grains, (c) melting the silicon grains in an atmosphere of a gas inert thereto to form a body of molten silicon, (d) cooling the silicon body until it has solidified, and (e) separating the solidified silicon melt from the liner.

The finely structured quartz liner is made from quartz wool or quartz sand or other finely structured quartz products by pressure sintering.

Quartz wool is a well known commodity, and is described, for example, in the treaties "Chemical Technology: An Encyclopedic Treatment," by G. F. Oss, Vol. II, at pages 22, (1970). This reference indicates that silica fibers are prepared on a large scale by spinning molten quartz in the same manner as is done for glass fibers and that this can be done so as to obtain a wool-like fiber. The chemical composition of quartz wool is that of pure quartz or silica, containing no silicate impurities, and in which any other impurities are present only in quantities measurable in a few parts per million. The quartz fibers are generally of the order of 1 to 20 micron, preferably, for the purposes of the present invention, between about 8 and 10 micron. The fiber length should not be less than about 1 mm. The quartz sand has a favorable granularity of 10 to 200$\mu$. The sintering is mostly performed at temperatures between 1,300° and 1,600°C. and under pressures between 0.05 and 1 kg/cm$^2$. The duration of the sintering depends on the quartz material used, the level of the temperature and of the pressure. Generally periods between 10 and 60 minutes are sufficient.

The molded bodies made from quartz preparations in this manner are then annealed and cleaned, to remove any impurities that may still adhere, stemming from the pressing tool. Hydrochloric acid or mixtures of hydrochloric acid and nitric acid have been found to be good cleaning agents.

The mold in which the quartz preparation is made is usually made of graphite, particularly electrographite. However, oxide ceramics with high melting points, e.g., aluminum oxide, are also useable substances. It is advantageous to make the quartz preparations with a wall thickness of 0.5 to 2 mm.

Since the quartz preparation can be made cheaply and simply, it is used only for making one molded silicon body. Therefore it is of no consequence whether or not it is destroyed by the removal of the silicon body.

It is also of advantage that the material of which the cooled mold consists can be chosen freely, because no doping of the silicon is possible. In this manner the temperature gradient melt/mold can be changed in a simple manner by the choice of the mold material. For instance, the gradient is greater when molds are made of metal, like copper and silver, while it is smaller with quartz oxide or aluminum oxide.

The mold is generally cooled with water, but other cooling liquids are also suitable. The heating and melting of the silicon is by inductive heating, where frequently a water-cooled high-frequency coil of copper is used.

It is unimportant in what granularity the silicon is supplied, but is must have a very high degree of purity.

The entire quantity of silicon is first melted held at between about 1,440° and 1,500°C., and then slowly cooled. The cooling can be accomplished, for instance, by reducing the high frequency output supplied. However, it is more favorable to remove the mold with the melt slowly from the induction-heated zone. There speeds of 0.5 to 2 mm/min. have been found to be useful.

As inert gas protection one uses mainly hydrogen and the noble gases or mixtures of said gases, preferably a mixture of about 10% by volume of hydrogen and 90% by volume of argon. One works mainly at normal pressures or not much above it. However, one can also work under reduced pressure.

The silicon bodies made in accordance with the invention can have highly varied shapes. For instance they can be made in the shape of discs, crucibles, cylindrical ingots or semispherical cups. If, as in the case of semispherical cups, the molded silicon body is to be hollow on one side, this can be achieved in a simple manner by immersing into the silicon melt from above a die which is shaped to form the hollow space. This die is not cooled, preferably it is heated and preferably also covered with a molding substance of quartz wool or quartz sand or both.

The heating of the die has the effect that the crystallization of the silicon begins only from the cooled mold, and the growth of the crystals does not progress from two directions. This would be detrimental to the infrared transmission of the silicon bodies.

The accompanying drawing is a schematic sectional view of an apparatus which can be used in carrying out the process of the invention.

In the drawing, a melting vessel or crucible 1 of semispherical shape made of quartz glass is cooled from below by running water. The water input is at 2, the runoff at 3. A cup of sintered quartz wool 4 fitted to the shape of the crucible is placed into the semispherical quartz crucible 1. The silicon melt 5 is in this insert. A semispherical die 6 of quartz glass is immersed from above into the silicon melt, this die likewise being covered with a layer of sintered quartz wool 7. The melting vessel 1 is surrounded by a quartz pipe 9 which contains the protective gas. The heating is accomplished by a water-cooled high frequency coil 8 of copper pipe, which surrounds the melting vessel 1.

Molded silicon bodies made in accordance with the process of the invention have the infrared transmission that is theoretically possible for silicon, e.g., 54% at a wave-length of 6μ, and they can therefore be used as entry ports or lenses for radiation receivers in the infrared spectral region, e.g. on control devices.

The process of the present invention is to be distinguished from that disclosed in Mytton, et al., U.S. Pat. No. 3,041,690, which relates to the processing of semiconductor material in molten state in a quartz vessel or crucible. The quartz crucible is coated with a layer of silicon nitride to offset the tendency of the semiconductor material to adhere to or react with the quartz vessel inner surface. This has the drawback that the silicon nitride is in practice available only in relatively impure form, and thus it offers a possibility of contaminating the semiconductor material to be cast. A further drawback is that it is difficult to achieve good adhesion of the silicon nitride powder to the quartz surface. It is also suggested in the patent that a quartz vessel without the coating is unsuitable for the preparation of silicon bodies. The silicon nitride coating prevents wetting of the quartz vessel by the melt and hence retards stresses due to volume changes upon cooling or solidifying of the melt, protecting the vessel against breakage. However, it is necessary to replace the silicon nitride coating after only two or three cycles. In contrast thereto, the present invention employs a liner of silicon, which is also wetted by the melt, but which owing to its elastic properties is capable of absorbing the stresses and not transmitting them to the crucible which is not strongly adhered to the liner.

Thus, the quartz liner preparation of the invention can have a thickness of between about 0.1 and about 1 mm., preferably between 0.2 and 0.6 mm. The quartz fiber liner of the present invention consists of only 50% to 70% of its volume of solid quartz fibers, the balance of the liner being voids filled with air. Thus, there is provided, in accordance with the present invention, a multilayered, wettable quartz fiber structure, rather than a compact quartz crucible.

DESCRIPTION OF THE PREFERRED EMBODIMENTS

EXAMPLE 1

Production of Molded Bodies of Sintered Quartz Wood.

Into a round mold of electrographite, quartz wool is pressed with a fitting die of electrographite and sintered under a pressure of 0.1 kg/cm² at a temperature of 1,500°C. for 15 minutes. A cup of quartz preparation is formed which fits into the quartz glass crucible 1, as shown in the drawing. In the same manner a cover layer 7 of quartz wool is made for the die 6.

EXAMPLE 2

Making a Semispherical Cup Consisting of Silicon

The apparatus as shown in the drawing is utilized. Into the mold portion of the crucible 1 there is inserted a liner of sintered quartz wool 4. Highly pure silicon (22 g) in the form of pieces with a range of grain size of 5 to 20 mm is melted in an atmosphere of 760 Torr (10% by volume hydrogen and 90% by volume argon). The temperature of the molten silicon is about 1,450°C. Subsequently the crucible 1 and a quartz die 6 provided with quantity fiber liner 7 are moved downward at a uniform speed of 1 mm/min. from the induction-heated zone provided by coil 8 (duration about 40 minutes). The solidified and cooled semispherical silicon cup is lifted from the crucible together with the adhering quartz fiber layers 4 and 7. It has an external diameter of 40 mm and an internal diameter of 30 mm and a thickness of 5 mm. The quartz layers can easily be removed mechanically without damaging the molded silicon body. The crucible mold 1 as well as the die 6 have no contact with the silicon melt and they can therefore be used again. The silicon is utilized 100%. A semispherical cup is formed whose transmission in the infrared spectral region reaches the maximum values of purest silicon.

What is claimed is:

1. Process for making molded silicon bodies by melting pure silicon by inductive heating in a mold capable of being cooled, which comprises the steps of:
   a. placing against the inner surface of said mold a liner consisting of a solid body of pressure-sintered finely structured quartz made of quartz wool having a fiber diameter between about 8 and 10 micron, and a fiber length not less than about 1 mm, having substantially the same configuration as the interior portion of said mold, said quartz liner having been sintered at a temperature between about 1,300° and about 1,600°C. under pressure between about 0.05 and about 1 kg/cm$^2$ for a period of time between about 10 and about 60 minutes;

b. introducing into said lined mold highly purified silicon having a grain size between about 5 and about 20 mm;

c. melting said silicon grains in an atmosphere of a gas inert thereto to form a body of molten silicon;

d. cooling said body of molten silicon at a high temperature gradient with the use of water as coolant until the body has solidified; and e. separating the solidified silicon melt from said liner.

2. The process of claim 1 in which the melting of the silicon in step (c) is carried at a temperature between about 1,440° and 1,500°C.

3. The process of claim 1 in which there is immersed into the molten silicon body from above a heated die shaped to form a hollow, said die being coated with a layer of said sintered finely structured quartz, to form a molded silicon body hollow on one side in a cup-like configuration.

* * * * *